Nov. 9, 1965  G. E. HOOK  3,216,693
SOLENOID INJECTION VALVE
Filed Dec. 19, 1962
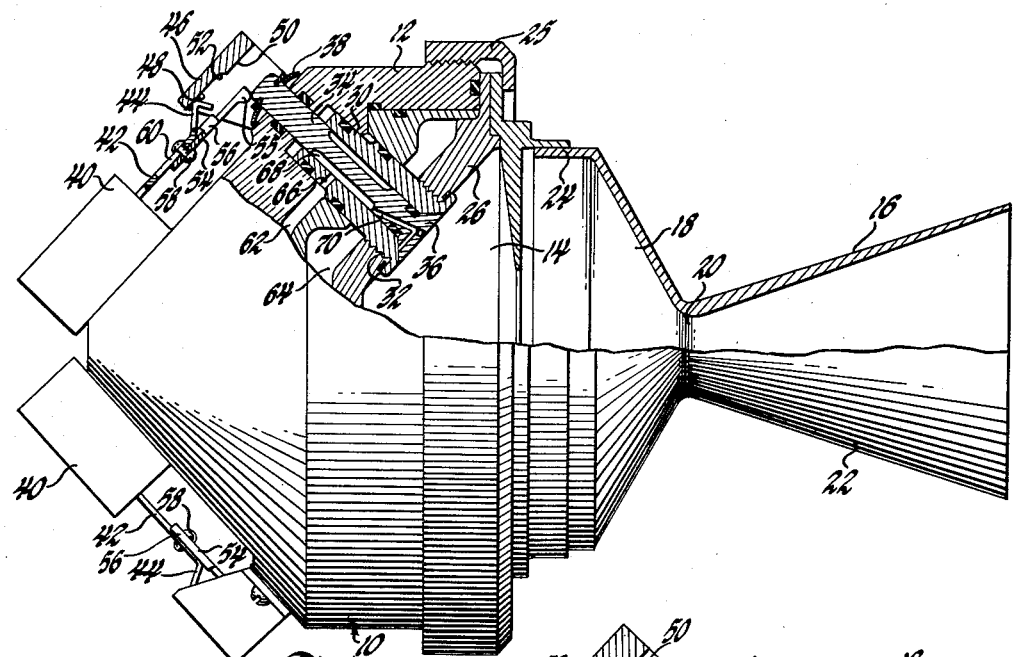
INVENTOR.
Gerald Edge Hook
BY
Paul Fitzpatrick
ATTORNEY

United States Patent Office 3,216,693
Patented Nov. 9, 1965

3,216,693
SOLENOID INJECTION VALVE
Gerald Edge Hook, Indianapolis, Ind., assignor to General Motors Corporation, Detroit, Mich., a corporation of Delaware
Filed Dec. 19, 1962, Ser. No. 245,854
5 Claims. (Cl. 251—77)

This invention relates to fuel injection means for rocket engines and, more particularly, it relates to a solenoid actuated lost motion momentary fuel injection system for a rocket engine.

In the present state of rocket engines there is an obvious need for injection means that will inject minute quantities of fuel and oxidizer into a combustion chamber for precise control of combustion and thrust. This need is evident in rocket systems where orientation control and maneuverability are essential.

This invention fills the above need by providing an injection system which is able to inject minute quantities of fuel and oxidizer into a combustion chamber of a rocket engine. This, therefore, is the main object of the invention. A further object of the invention is to provide an injection system which is relatively simple both in construction and in action.

Other objects, features and advantages of the invention will become apparent upon reference to the succeeding detailed description of the invention and to the drawings illustrating the preferred embodiment thereof; wherein, FIGURE 1 is a schematic illustration of the rocket engine with the injection means shown in cross section and at the start of its cycle;

FIGURE 2 is an enlarged cross sectional view of the injection means with the valve actuator starting to engage the surface of the valve shank;

FIGURE 3 is an enlarged view of the injection system with the valve actuator providing maximum displacement of the valve shank and showing the valve in the open position;

FIGURE 4 is a similar cross sectional view of the injection means during the return stroke of the actuator; and FIGURE 5 is a partial sectional view of the injector means showing the valve actuator almost at the end of its cycle.

In general, the invention relates to a solenoid actuated injection system for injecting propellants such as fuel and oxidizer into the combustion chamber of a rocket engine. The actuation of an injection valve is accomplished by a solenoid driving a member which rides a cam surface and displaces another member to which it is attached by a lost motion connecting means. The latter member applies a force for a short period of time to the valve. This force is applied only on the forward stroke of the mechanism, as on the return stroke the lost motion is taken up and the solenoid actuator pulls the driving member over the raised portion of the cam surface before it is in position to put a force on the actuating member. Thus, by the use of lost motion connecting means, the valve opening is limited to a very short period of time during the working stroke of the solenoid only, and in one direction only.

More specifically, FIGURE 1 shows a rocket engine 10 having a combustion chamber housing 12 defining a combustion chamber 14 and a main exhaust nozzle 16. The exhaust nozzle 16 is of the convergent-divergent type with a converging inlet portion 18, a venturi or throat portion 20, and a diverging conical exit portion 22. The exhaust nozzle 16 may be connected to the combustion chamber housing 12 by any suitable means such as a flanged ring 24 welded to the nozzle and a nut 25. The inner liner wall or liner 26 of the combustion chamber 14 and the nozzle 16 may be of any suitable structural material that can withstand the temperatures of the combustion process. Since the invention lies in the injection means, it is felt that a further discussion of rocket combustion chamber and nozzle structure is not necessary, and that the preceding discussion is sufficient.

The injection system is mounted in a valve body or housing 30. This valve body 30 is inserted into the combustion chamber housing 12 and held there by threads 32 engaging the liner 26. Slidably received by the valve body 30 is the valve shank 34. The valve shank 34 has a conical valve head 36. When in the closed position the conical valve head 36 seats against the valve body structure 30. The valve shank 34 is held within the valve body 30 by a force resisting spring washer 38, which bears against the combustion chamber housing 12 and provides the closing force on the valve shank 34.

The source of the motion for the actuation part of the injection device is the solenoid 40 shown in outline. Briefly, the solenoid 40 has a movable member or armature 42 which receives its motion from the magnetic force of an electric coil. This force is controlled by the current flowing through the winding. Since the solenoid is a common device, a further discussion of its function is not felt to be necessary. The solenoid 40 transmits its motion directly to the driven member 42 which has a cam follower portion 44 cooperating with the cam 46 which is attached to the combustion chamber housing 12. The cam 46 has two different levels, the relaxation level 48 and the force producing level 50. The two levels are connected by a curved transition portion 52. Pinned to the driven member 42 is the valve actuator member 54, which contains a raised portion 55. The driven member 42 rides along the top surface of the actuator member 54 and is restrained thereupon by flange portions 56. The raised flange portions 56 of the valve actuator member 54 are positioned to restrict the driven member 42 from any sideward motion and to maintain its motion along one axis. The driven member 42 and the valve actuator member 54 are connected by a rivet 58. The connecting rivet 58 is fixed to the valve actuator member 54 but is slidable in the driven member 42. The driven member 42 contains a longitudinal slot 60 in which the connecting rivet 58 slides. This then results in the lost motion which is an essential part of the injection device.

The combustion chamber housing 12 contains a fuel passage 62 and an oxidizer passage 64 which lead from their respective storage tanks. Aligned with the fuel passage 62 in the combustion chamber housing 12 is a fuel passage 66 in the valve body member 30. This fuel passage 66 in the valve body housing 30 facilitates the flow of fuel into the valve area 68. This fuel compartment 68 has been formed by removing a portion of the valve shank 34. As shown in the figures, the oxidizer passage 64 is blocked by the valve body 30. In the diametrically opposite injection system, partially shown in FIGURE 1, the opposite case would be true. The valve body 30 then would be constructed so that the fuel passage 62 is blocked off and an opening is formed to align with the oxidizer passage 64 to allow it to flow around the cutaway portion 68 of the valve shank 34. Therefore, it can be seen there are two distinct types of valve bodies. A further feature of the fuel system are the fuel passages 70 which connect the fuel holding compartment 38 and the surfaces of the valve head 36.

The previously recited component members operate in combination as follows. First, we assume that the fuel compartment 68 is supplied with either fuel by the passages 62 and 66 or by oxidizer through the passage 64. Whether it is filled with fuel or oxidizer will, of course, be determined by the choice of the valve body structure 30. Now when a short burst of thrust is needed for orientation control, the solenoid 40 is activated and imparts a thrust motion to the driven member 42. As is seen by the transition from FIGURE 1 to FIGURE 2, the driven member 42 will then proceed to slide along the valve actuator member 54 until the connecting pivot rivet 58 has run the full length of the slot 60. At this point the cam follower member 44 of the driven member 42, will have reached the end of the relaxed surface 48 and will have traversed the transition portion 52 and will make driving contact with the valve actuator member 54. Up to this point the valve actuator member 54 has been stationary. Now as is seen in the transition from FIGURE 2 to FIGURE 3 the driven member 42 and the valve actuator member 54 held together by the rivet 58 move as a unit across the end of the valve shank 34. As it traverses across the surface of the valve shank 34, the raised portion 55 of the valve actuator 54 causes the valve shank 34 to move in the downward direction, thus opening up the valve flow portion caused by the moving of the valve head 36 away from its seat in the valve body 30. The length of the stroke is predetermined so that the motion continues until the raised portion 55 of the valve actuator 54 has gone beyond the surface of the valve shank 34, thereby releasing it from the open position so that the valve head 36 returns to its seated position in the valve body 30. When it has reached the end point of the stroke, the reverse stroke starts by the recalling of the driven member 42 by the solenoid 40. The driven member 42 will then slide back along the valve actuator member 54 the full length of the slot 60 which is the same distance as the cam follower has to travel before it disengages the force producing surface of the cam. This transition is seen in going from FIGURE 3 to FIGURE 4. At the instant that the rivet 58 has reached the end of the slot 60, the cam follower 52 has descended to the relaxation surface 48 and therefore applies no force on the valve actuator 54 which then slides back across the valve shank 34. On the return stroke, therefore, the spring washer 38 keeps the valve shank 34 from being displaced. The transition from FIGURE 4 to FIGURE 5 shows the reverse movement of the whole structure as the valve actuator member traverses the end of the valve shank 34. And as is seen in the transition from FIGURE 5 to FIGURE 1, the return stroke continues until the valve actuator 54 has returned to the front edge of the valve shank 34 and the process is then ready to repeat itself. Thus, it can be seen from the preceding description that the valve is only opened for the very short period of time that the valve actuator raised portion 55 passes over the valve shank 34 in the forward direction with the cam follower 44 engaging it.

Intuitively then, a pair of injectors will facilitate the simultaneous injection of fuel and oxidizer in very minute quantities into the combustion chamber. The number of injectors used on a given rocket engine will then be a function of the performance characteristics desired. It would be safe to say that the injectors will be most probably used in pairs, namely, one for oxidizer and one for fuel. Therefore, it should be clear that the subject invention provides an injection system that is both simple and efficient and it will inject the minute quantities of both oxidizer and fuel needed in present day control systems for rocket engine systems.

While the invention has been illustrated in connection with a rocket engine, it will be clear to those skilled in the art to which the invention pertains that it would have use in many installations where the injection of minute quantities of substance is desired, and that many changes and modifications may be made thereto without departing from the scope of the invention.

I claim:

1. A fluid injection means comprising an actuator, a driven member reciprocated by the actuator including a cam follower, a cam disposed to bias the follower transversely to its direction of actuated motion, the cam including a raised portion, a valve actuator mounted on the driven member to be driven thereby, a lost-motion connection between the valve actuator and the driven member for relative movement therebetween, a movable valve member, means on the valve actuator slidable past and engageable with the movable valve member under the influence of the raised portion of the cam, the lost-motion connection causing the valve actuator to ride over the movable valve member concurrently with the engagement of the cam follower with the raised portion of the cam in one direction of actuated motion to operate the valve, and causing the follower to clear the raised portion prior to the valve actuator riding over the movable valve member in the reverse direction of motion, and means biasing the valve member in opposition to the valve actuator.

2. A fluid injection means comprising a solenoid, a driven member reciprocated by the solenoid including a cam follower, a cam disposed to bias the follower transversely to its direction of reciprocation, the cam including a raised portion, a valve actuator mounted on the driven member for reciprocation therewith, a lost-motion connection between the valve actuator and the driven member for relative reciprocation, a valve including a shank, means on the valve actuator slidable past and engageable with the valve shank under the influence of the raised portion of the cam, the lost-motion connection causing the valve actuator to ride over the shank concurrently with the engagement of the cam follower with the raised portion of the cam in one direction of reciprocation to operate the valve, and causing the follower to clear the raised portion prior to the valve actuator riding over the valve shank in the reverse direction of motion, and means biasing the valve shank in opposition to the valve actuator.

3. A fluid injection means adapted to be received within a housing, said injection means comprising a solenoid, a driven member reciprocated by the solenoid including a cam follower, a cam disposed to bias the follower transversely to its direction of reciprocation, the cam including a raised portion, a valve actuator mounted on the driven member for reciprocation therewith, a lost-motion connection between the valve actuator and the driven member for relative reciprocation, a valve member including a shank, a valve body attached within said housing and slidingly receiving the valve shank, said valve body having fluid passages which align with corresponding passages in said housing, means on the valve actuator slidable past and engageable with the valve shank under the influence of the raised portion of the cam, the lost-motion connection causing the valve actuator to ride over the shank concurrently with the engagement of the cam follower with the raised portion of the cam in one direction of reciprocation to operate the valve, and causing the follower to clear the raised portion prior to the valve actuator riding over the valve shank in the reverse direction of lost-motion, and means biasing the valve shank in opposition to the valve actuator.

4. A fluid injection means adapted to be received within a housing, said injection means comprising a solenoid, a driven member reciprocated by the solenoid including a cam follower, a cam disposed to bias the follower transversely to its direction of reciprocation, the cam including a raised portion, a valve actuator mounted on the driven member for reciprocation therewith, a lost-motion connection between the valve actuator and the driven member for relative reciprocation, a valve member including a shank, a valve body received within said housing and slidingly receiving the valve shank, said valve shank being restrained within the valve body by a spring washer means, means on the valve actuator slidable past and engageable with the valve shank under the influence of the raised portion of the cam, the lost-motion connection causing the valve actuator to ride over the shank concurrently with engagement of the cam follower with the raised portion of the cam in one direction of reciprocation, and causing the follower to clear the raised portion prior to the valve actuator riding over the valve shank in the reverse direction of motion.

5. A fluid injection means adapted to be received within a housing, said injection means comprising a solenoid, a driven member reciprocated by the solenoid including a cam follower, a cam disposed to bias the follower transversely to its direction of reciprocation, the cam including a raised portion, a valve actuator mounted on the driven member for reciprocation therewith, a lost-motion connection between the valve actuator and the driven member for relative reciprocation, a valve including a shank, a valve body attached within said housing and slidingly receiving the valve shank, said valve shank being restrained within the valve body by a spring washer means, said valve body having fluid passages which align with corresponding passages in the housing, said valve shank having a reduced area portion providing a fluid housing chamber which receives said fluid from the passages in the valve body, means on the valve actuator slidable past and engageable with the valve shank under the influence of the raised portion of the cam, the lost-motion connection causing the valve actuator to ride over the shank concurrently with the engagement of the cam follower with the raised portion of the cam in one direction of reciprocation, and causing the follower to clear the raised portion prior to the valve actuator riding over the valve shank in the reverse direction of motion.

References Cited by the Examiner

UNITED STATES PATENTS

| | | | |
|---|---|---|---|
| 2,196,120 | 4/40 | Parker | 251—138 |
| 3,088,406 | 5/63 | Horner | 60—35.6 |

LAVERNE D. GEIGER, *Primary Examiner.*

MILTON KAUFMAN, *Examiner.*